(12) United States Patent
Stewart et al.

(10) Patent No.: US 7,737,825 B1
(45) Date of Patent: *Jun. 15, 2010

(54) INTEGRATED CIRCUITS WITH PERSISTENT DATA STORAGE

(75) Inventors: Roger G. Stewart, Morgan Hill, CA (US); John Rolin, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/263,792

(22) Filed: Oct. 31, 2005

Related U.S. Application Data

(60) Continuation of application No. 11/153,030, filed on Jun. 14, 2005, now Pat. No. 7,364,084, which is a division of application No. 10/140,589, filed on May 7, 2002, now Pat. No. 6,942,155.

(60) Provisional application No. 60/294,661, filed on May 31, 2001.

(51) Int. Cl.
*H04Q 5/22* (2006.01)

(52) U.S. Cl. .................. 340/10.5; 34/10.4; 34/5.61; 34/5.31; 34/825.36; 34/540

(58) Field of Classification Search ............... 340/10.3, 340/10.31, 572.3, 10.2, 10.1, 10.4, 5.61, 340/825.69, 5.31, 825.36, 540
See application file for complete search history.

(56) References Cited

U.S. PATENT DOCUMENTS

| | | | |
|---|---|---|---|
| 3,811,051 A | 5/1974 | Merrell | |
| 4,075,632 A | 2/1978 | Baldwin et al. | |
| 4,114,151 A | 9/1978 | Denne et al. | |
| 4,498,076 A | 2/1985 | Lichtblau | |
| 4,567,473 A | 1/1986 | Lichtblau | |
| 4,674,618 A | 6/1987 | Eglise | |

(Continued)

FOREIGN PATENT DOCUMENTS

DE 3907519 A1 9/1990

(Continued)

OTHER PUBLICATIONS

Chatterjee, et al. "A Survey of High-Density Dynamic RAM Cell Concepts", ED-26 IEEE Transactions on Electron Devices, Jun. 1979, pp. 827-839.

(Continued)

*Primary Examiner*—Vernal U Brown
(74) *Attorney, Agent, or Firm*—Blakely, Sokoloff, Taylor & Zafman LLP

(57) ABSTRACT

The circuitry introduced in this invention selectively slows down the functioning of an electronic circuit by maintaining a particular state for a prolonged period of time. This circuitry is used not only to achieve the desired effect in maintaining security from electronic thieves trying to circumvent codes but also in other applications such as enabling a circuit to continue to function in the event of a brief loss of power. For example, in an RFD system, if a reader is frequency hopping, a tag loses power for as long as about 400 milliseconds when the reader changes to other frequencies. In a preferred embodiment, the disclosed circuitry is used in conjunction with a destruct sequence.

39 Claims, 4 Drawing Sheets

U.S. PATENT DOCUMENTS

| | | | |
|---|---|---|---|
| 4,724,427 | A | 2/1988 | Carroll |
| 4,914,735 | A | 4/1990 | Ichiyoshi |
| 4,955,038 | A | 9/1990 | Lee et al. |
| 5,053,774 | A | 10/1991 | Schuermann et al. |
| 5,151,684 | A * | 9/1992 | Johnsen ............... 340/568.1 |
| 5,164,985 | A | 11/1992 | Nysen et al. |
| 5,214,409 | A | 5/1993 | Beigel |
| 5,253,162 | A | 10/1993 | Hassett |
| 5,287,112 | A | 2/1994 | Schuermann |
| 5,365,551 | A | 11/1994 | Snodgrass et al. |
| 5,392,184 | A | 2/1995 | Unterlass et al. |
| 5,410,315 | A | 4/1995 | Huber |
| 5,448,847 | A | 9/1995 | Teetzel |
| 5,473,496 | A | 12/1995 | Rouy |
| 5,479,172 | A | 12/1995 | Smith et al. |
| 5,521,601 | A | 5/1996 | Kandlur et al. |
| 5,528,221 | A | 6/1996 | Jeuch et al. |
| 5,530,702 | A * | 6/1996 | Palmer et al. ............... 370/445 |
| 5,539,775 | A | 7/1996 | Tuttle |
| 5,550,547 | A * | 8/1996 | Chan et al. .................. 342/42 |
| 5,559,505 | A * | 9/1996 | McNair ..................... 340/5.28 |
| 5,621,598 | A | 4/1997 | Pitre et al. |
| 5,793,305 | A * | 8/1998 | Turner et al. ............ 340/10.34 |
| 5,796,284 | A | 8/1998 | Clemen et al. |
| 5,812,065 | A * | 9/1998 | Schrott et al. ........... 340/10.34 |
| 5,850,181 | A | 12/1998 | Heinrich et al. |
| 5,874,902 | A | 2/1999 | Heinrich et al. |
| 5,912,632 | A | 6/1999 | Dieska et al. |
| 5,943,256 | A | 8/1999 | Shimizu et al. |
| 5,963,144 | A | 10/1999 | Kruest |
| 6,025,780 | A | 2/2000 | Bowers et al. |
| 6,097,622 | A | 8/2000 | Shimizu et al. |
| 6,104,281 | A * | 8/2000 | Heinrich et al. ............ 340/10.5 |
| 6,130,602 | A | 10/2000 | O'Toole et al. |
| 6,147,605 | A | 11/2000 | Vega et al. |
| 6,169,483 | B1 | 1/2001 | Ghaffari et al. |
| 6,172,596 | B1 * | 1/2001 | Cesar et al. ............. 340/10.41 |
| 6,173,899 | B1 | 1/2001 | Rozin |
| 6,181,248 | B1 | 1/2001 | Fockens |
| 6,189,789 | B1 | 2/2001 | Levine et al. |
| 6,198,381 | B1 | 3/2001 | Turner et al. |
| 6,201,731 | B1 | 3/2001 | Kamp et al. |
| 6,229,367 | B1 | 5/2001 | Choudhury |
| 6,232,677 | B1 | 5/2001 | Tuttle et al. |
| 6,248,606 | B1 | 6/2001 | Ino et al. |
| 6,292,508 | B1 | 9/2001 | Hong et al. |
| 6,294,997 | B1 | 9/2001 | Paratore et al. |
| 6,317,028 | B1 * | 11/2001 | Valiulis ..................... 340/10.1 |
| 6,366,099 | B1 | 4/2002 | Reddi |
| 6,400,196 | B1 | 6/2002 | Aoki et al. |
| 6,404,325 | B1 * | 6/2002 | Heinrich et al. .......... 340/10.34 |
| 6,407,669 | B1 | 6/2002 | Brown et al. |
| 6,412,207 | B1 | 7/2002 | Crye et al. |
| 6,454,605 | B1 | 9/2002 | Bassler et al. |
| 6,476,708 | B1 | 11/2002 | Johnson |
| 6,486,530 | B1 * | 11/2002 | Sasagawa et al. ........... 257/532 |
| 6,501,390 | B1 | 12/2002 | Chainer et al. |
| 6,522,170 | B1 | 2/2003 | Durham et al. |
| 6,598,791 | B2 | 7/2003 | Bellis, Jr. et al. |
| 6,631,503 | B2 | 10/2003 | Hsu et al. |
| 6,681,989 | B2 | 1/2004 | Bodin |
| 6,794,000 | B2 | 9/2004 | Adams et al. |
| 6,812,841 | B2 | 11/2004 | Heinrich et al. |
| 6,842,121 | B1 * | 1/2005 | Tuttle ....................... 340/693.9 |
| 6,933,848 | B1 | 8/2005 | Stewart et al. |
| 6,933,948 | B2 | 8/2005 | Stewart et al. |
| 6,942,155 | B1 | 9/2005 | Stewart et al. |
| 6,995,652 | B2 * | 2/2006 | Carrender et al. .......... 340/5.61 |
| 7,113,095 | B2 | 9/2006 | Kuzma et al. |
| 7,116,240 | B2 | 10/2006 | Hyde |
| 7,123,978 | B2 * | 10/2006 | Hartman et al. .............. 700/108 |
| 7,129,844 | B2 | 10/2006 | Pan |
| 7,173,528 | B1 | 2/2007 | Stewart et al. |
| 7,245,213 | B1 | 7/2007 | Esterberg et al. |
| 7,248,142 | B2 | 7/2007 | Littlechild et al. |
| 7,248,145 | B2 | 7/2007 | Littlechild et al. |
| 7,259,654 | B2 | 8/2007 | Littlechild et al. |
| 2002/0149468 | A1 | 10/2002 | Carrender et al. |
| 2003/0007473 | A1 | 1/2003 | Strong et al. |
| 2003/0137400 | A1 | 7/2003 | Heinrich et al. |
| 2005/0237844 | A1 | 10/2005 | Hyde |
| 2006/0061475 | A1 | 3/2006 | Moskowitz et al. |
| 2006/0132313 | A1 | 6/2006 | Moskowitz |

FOREIGN PATENT DOCUMENTS

| | | |
|---|---|---|
| EP | 0 733 988 A2 | 9/1996 |
| GB | 2333495 A | 7/1999 |
| JP | 09135481 A | 5/1997 |
| WO | WO 01/65712 A1 | 9/2001 |
| WO | WO 03/063076 A1 | 7/2003 |

OTHER PUBLICATIONS

DeMassa, T.A., Electrical and Electronic Devices, Circuits, and Instruments, 1989, p. 52.

Haznedar, Haldun "Digital Microelectronics" p. 444-446.

Finkenzeller, K., The RFID Handbook, Fundamental and Applications in Contactless Smart Cards and Identification, 2nd Ed., Wiley, p. 274.

ISD664 Chip ASIC Design Report, HML 231 & HML 232, pp. 1-65.

Kang, et al., "CMOS Digital Integrated Circuits", Analysis and Design, 1999, pp. 442-446.

Mazidi, A et al. Assembly Language, Design and Interfacing, 1998, p. 238.

Taub, et al. "Digital Integrated Electronics", 1977, p. 46.

Micron RFID Communications Protocol, Jul. 22, 1993, Pre-Release Version 0.95 (77 pgs.).

* cited by examiner

INTEGRATED CIRCUITS WITH PERSISTENT DATA STORAGE

RELATED APPLICATIONS

This application is a continuation of and claims priority from U.S. patent application Ser. No. 11/153,030 filed on Jun. 14, 2005 now U.S. Pat. No. 7,364,084 which is a divisional application of and claims priority from U.S. patent application Ser. No. 10/140,589 filed on May 7, 2002, which issued as U.S. Pat. No. 6,942,155 on Sep. 13, 2005 and which claims priority from U.S. Provisional Patent Application entitled "ICs with Persistent Data Storage," filed on May 31, 2001 under Ser. No. 60/294,661 and which is herein incorporated by reference in its entirety.

FIELD OF THE INVENTION

The present invention relates to radio frequency identification (RFID), and more particularly, this invention relates to persistent data storage in an RFID tag.

BACKGROUND OF THE INVENTION

Radio frequency identification (RFID) is a technology that incorporates the use of electromagnetic or electrostatic coupling in the radio frequency (RF) portion of the electromagnetic spectrum to uniquely identify an object, animal, or person. RFID is coming into increasing use in industry as an alternative to the bar code. The advantage of RFID is that it does not require direct contact or line-of-sight scanning. RFID is sometimes also called dedicated short range communication (DSRC).

In an RFID system multiple wireless tags are interrogated by sending information from an interrogating transmitter to the tags and having information transmitted by the tag in response. This is commonly accomplished by having the tag listen for an interrogation and for it to respond with a unique serial number and/or other information. However, it is desirable to extend the range of wireless tags so that it is not necessary to bring each tag close to a reader for reading. Three problems are evident when extending the range of the reading system. One of the problems is that there is limited power available for transmission from the wireless tag. Two, if the range is significant, it is possible that many tags will be within range of the interrogating system and their replies may corrupt each other. And, three, tag power supply levels will vary during their dialog with readers and may even be frequently interrupted entirely for periods up to one second.

RFID tags can be used to identify items. And, as outlined, there are known methods that enable one specific tag in a group of many tags to be interrogated without corruption by other tags of information sent by that one particular tag to the reader and without accidental transmission of data or commands to other tags of information sent to that particular tag.

The least expensive tags usually have EEPROM or read only memory. This is adequate for identifying a tag and for executing a purchase. However, at times, the purchaser might require privacy after the purchase so that another party cannot perform a scan and learn the contents of that purchaser's purse, car or home.

Thus, there are times when it is desirable to permanently disable or destroy an RFID tag after purchase. Furthermore, when a tag is destroyed it is desirable that other tags within range of the disabling device, typically a reader, are not also destroyed.

Although there are times when it would be desirable to intentionally and selectively destroy a tag so that it is no longer possible to read the information encoded on that tag, at the same time, it is also important to not create an opportunity for theft.

It would also be desirable to keep the cost of a tag and peripheral equipment to a minimum, and to enable rapid interrogation of a tag. One means of achieving these goals is in using short code lengths, for example 8 bits. However, an eight bit code has only 256 possible permutations and its protective effect can be circumvented by use of various electronic devices. It would therefore also be desirable to inhibit the use of electronic means that rapidly transmit all permutations of a code in order to circumvent a device's security.

Likewise, it is also important that certain tag states like the SLEEP/WAKE or other command states persist even through short interruptions of the power supply.

DISCLOSURE OF THE INVENTION

One method of achieving the goals set forth above would be to introduce a delay between the time when an incorrect code is input and the device can be reset and ready to recognize and evaluate the next code that is transmitted to the device. However, in order to introduce such a method, one must selectively slow down an inherently fast electronic circuit. That is, it is desirable to retain the speed of that circuit in some circumstances instances and to slow it down in other circumstances.

The circuitry introduced in this invention selectively slows down the functioning of an electronic circuit by maintaining a particular state for a prolonged period of time. This circuitry is used not only to achieve the desired effect in maintaining security from electronic thieves trying to circumvent codes but also in other applications such as enabling a circuit to continue to function in the event of a brief loss of power. For example, in an RFID system, if a reader is frequency hopping, a tag loses power for as long as about 400 milliseconds when the reader changes to other frequencies.

In one embodiment, the disclosed circuitry is used in conjunction with a destruct sequence. The destruct sequence of commands comprises an identity match; followed by a correct response; followed by a purchase. The cash register reader then provides a unique 8-bit DESTRUCT code within 5 seconds; which then creates a minimum 5 second window in which the tag can be destroyed within a range of 10 cm. Receipt of further DESTRUCT commands is automatically disabled for 5 seconds or more after any unsuccessful destruct attempt.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
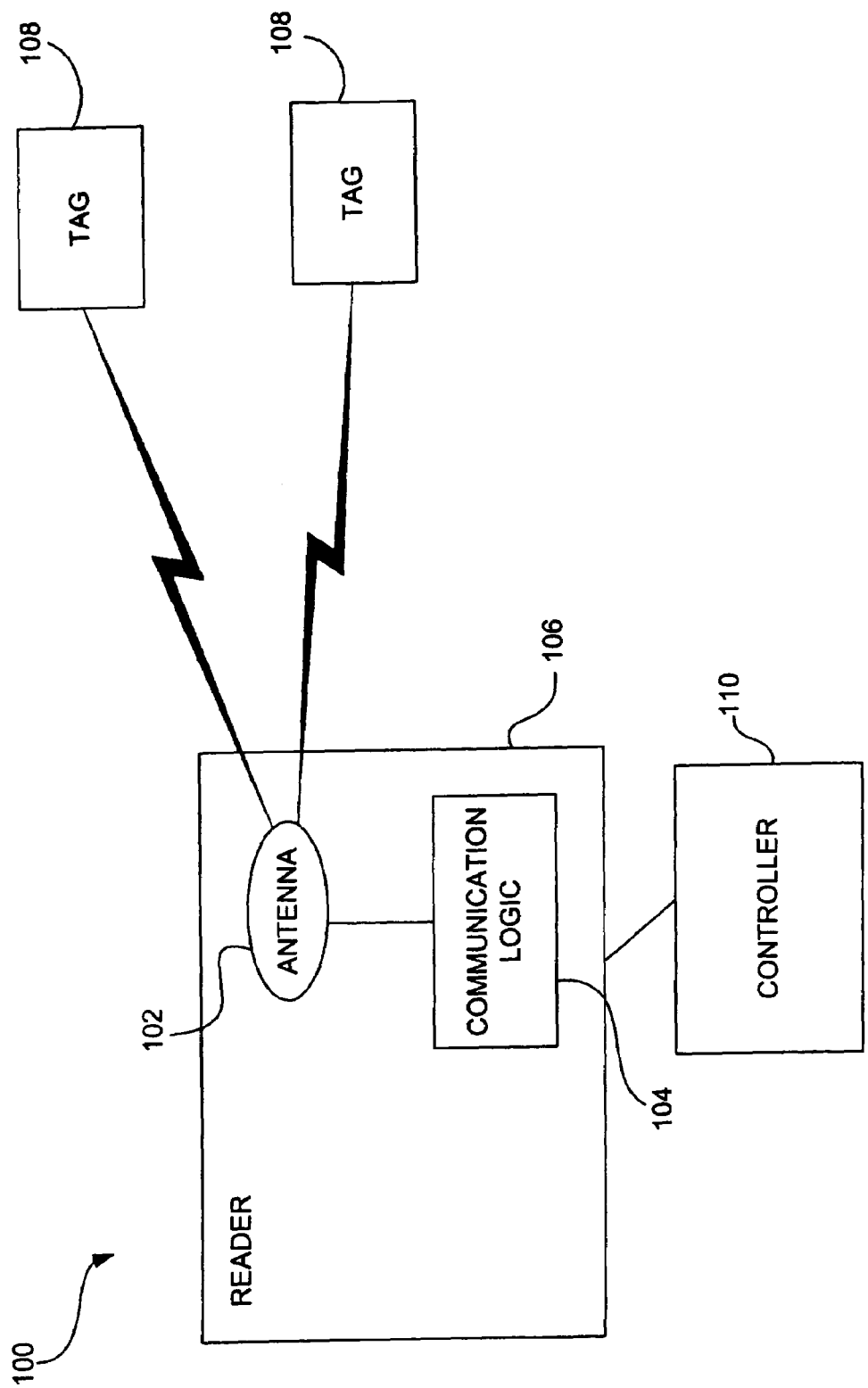
FIG. 1 depicts an RFID system according to one embodiment.

FIG. 1 depicts an RFID system 100 according to one embodiment. As shown, the system includes three components: an antenna 102 and transceiver 104 (here combined into one reader 106) and one or more transponders 108 (the tags). The transceiver is a combination transmitter/receiver in a single package. The antenna uses radio frequency waves to transmit a signal that activates a tag. When activated, the tag transmits data back to the antenna. The data is used to notify a programmable logic controller 110 that an action should occur. The action could be as simple as raising an access gate or as complicated as interfacing with a database to carry out a monetary transaction. High and low-frequency systems may be used in any of the embodiments described herein. Illustrative low-frequency RFID systems (30 KHz to 15 MHz) have short transmission ranges (generally less than six feet). Illustrative high-frequency RFID systems (850 MHz to 950 MHz and 2.4 GHz to 2.5 GHz) offer longer transmission ranges (more than 90 feet).

Figure 2:
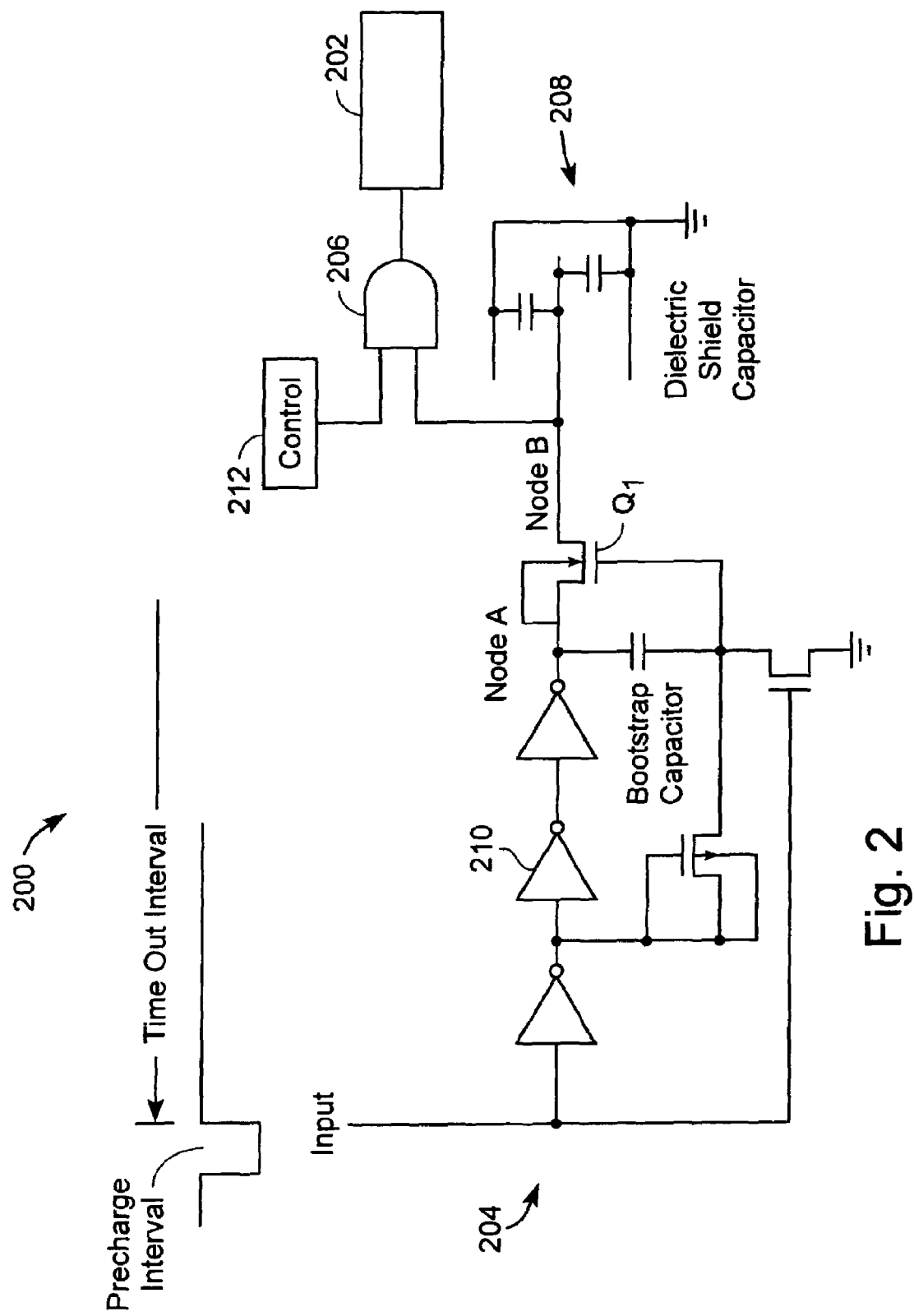
FIG. 2 is a diagram of an embodiment of the invention in a PMOS circuit.
Figure 5:
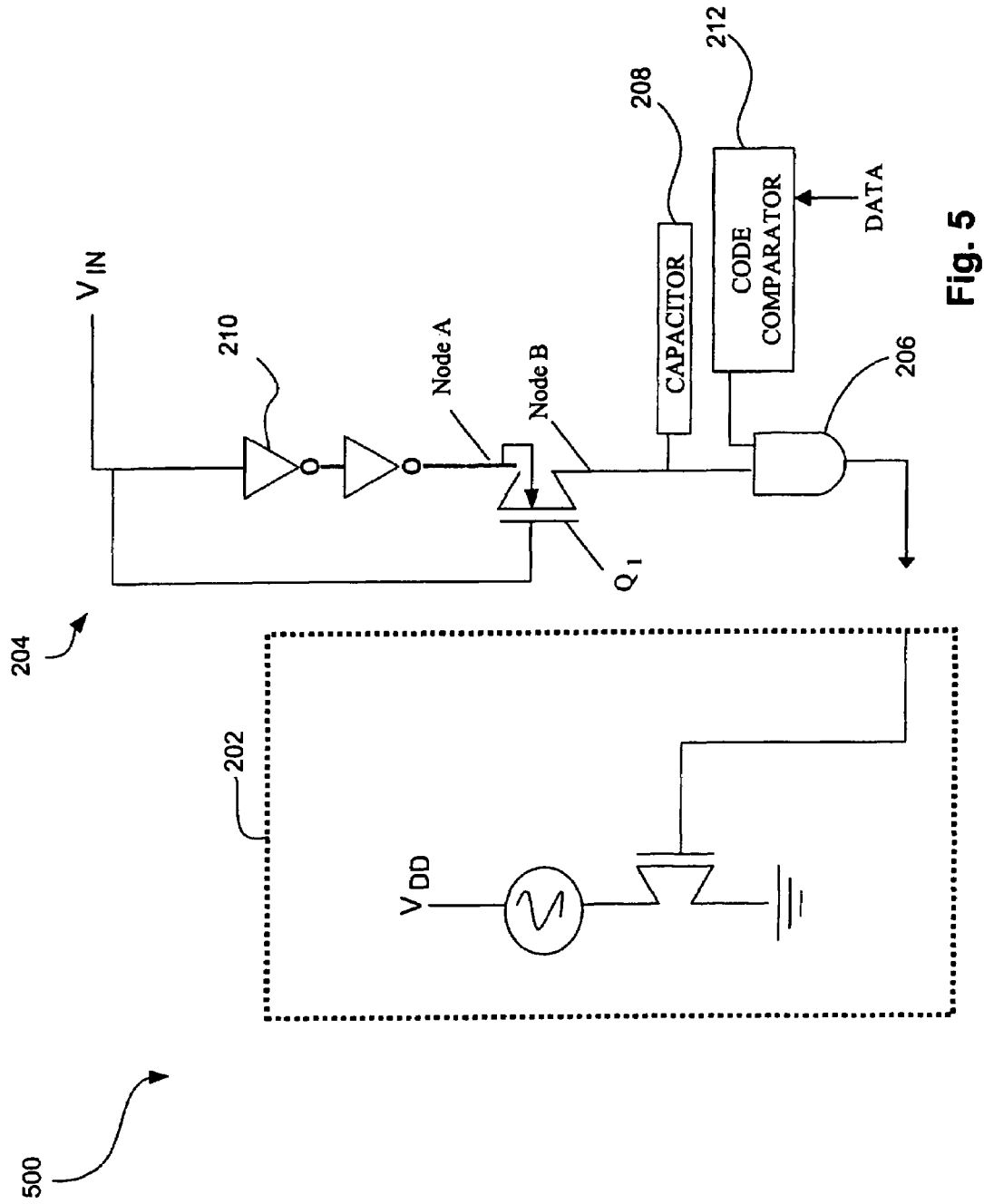
FIG. 5 is a diagram of an embodiment of the invention in an NMOS circuit.

FIGS. 2 and 5 illustrate destruct circuits 200, 500 that utilize the timing structure of the invention. The disable circuit 200 illustrated in FIG. 2 comprises a timing delay that is unique and that is connected to trigger any of a number of known disabling means 202. FIG. 2 illustrates timing delay logic 204 and an example of a known disabling means 202 in the dotted box on the left. The disabling means 202 illustrated will blow a fuse and destruct when current passes from the AND gate 206 of the timing delay logic circuit and enters the disabling circuit 202. One skilled in the art will recognize that a disabling circuit with a fuse, an anti-fuse, EEPROM (or other non-volatile memory or element) or any other circuit suitable for temporarily or permanently disabling the chip can be substituted for the disabling means illustrated in FIG. 2. The exact disabling means selected may be chosen on the basis of the effect one wishes to achieve.

As for the timing logic 204 of the circuits illustrated, the logic presented is unique. The logic comprises at least one and preferably three or more inverters 210, a dielectric, shielded capacitor or other low-leakage charge storage device (see FIG. 4) 208, an NMOS $Q_1$ (Note that a PMOS or other transistor can be used with minor modification to the logic design as would be recognized by one skilled in the art.), and an AND enable gate 206. Importantly, regardless of whether the power is high or low, all the leakage is through the junction to ground and occurs equally fast whether or not the power is on.

With an N device (NMOS) all leakage is to ground. The advantage of the N circuits shown in FIGS. 2 and 5 is that they guarantee that both source drain leakage and junction leakage is to ground. FIG. 2 is a preferred bootstrap circuit which avoids offset between node A and B. FIG. 5 is a simpler NMOS circuit without bootstrap.

Therefore, during the time out interval both the junction and all significant drain leakage paths (drain-to-source and drain-to-substrate) must go to ground, whether a PMOS or NMOS is used.

One skilled in the art can operate this circuit in the opposite polarity using P transistors or diodes by storing a negative voltage and allowing leakage to occur to the more positive level.

In the circuits illustrated in FIGS. 2 and 5 both illustrate two capacitors in parallel, the intended storage on the dielectric capacitor, and there is a parasitic junction capacitance between the drain node and ground. See FIG. 4.

One should note that depending on the exact design of the circuit and its intended use one would use an odd number of inverters (as in the NMOS circuit of FIG. 2) if one wishes the voltage at node A to be low during the timeout interval when the input voltage is high and an even number of inverters (as in the NMOS circuit in FIG. 5) if one wishes the voltage at node A to be high during the timeout interval when the input voltage is high.

It is further noted that the use of a series of inverters in FIGS. 2 and 5 is for example only. One skilled in the art will recognize that other logic can be substituted provided that the constraints noted for the PMOS and NMOS circuits are met.

The AND gate is enabled when the correct disable (or destruct) code is received at the AND data input from the code controller 212 (see FIGS. 2 and 5) and the proper voltage (high or low) is received at the AND control input. In the case of the logic illustrated the AND control voltage must be high. The capacitor is preferably a double polysilicon structure consisting of an intermediate conductor sandwiched between two polysilicon shields, yet insulated from them by an insulator such as silicon nitride or silicon dioxide. When the NMOS transistor is turned off, no signal arrives at the AND control input. The NMOS transistor is preferably a minimum sized transistor, which provides a very small semiconductor path, and only minimum depletion region volume, and is used to charge the capacitor, which has a very large capacitance and is dielectrically isolated, with negligible leakage. The time constant of the dielectric capacitance portion of this circuit exceeds 10 seconds and most preferably is hundreds of years in contrast to the junction capacitance portion of this circuit which is typically less than one second at room temperature.

The circuit functions as follows. When the voltage input is high the NMOS transistor is in a high impedance state and the voltage at the end of the series of three invertors is low, so that no voltage is available to the capacitor and the AND gate. When the voltage input is low, the NMOS switch will conduct and the voltage at the end of the series of three invertors is high and is available to charge the capacitor.

The capacitor is initially charged and must remain charged to initiate destruction of the tag. If the correct code is entered and Node B is high, the AND gate transmits a high voltage to the disable circuit and the fuse is blown and the tag is destroyed. Thus, the first time one tries to activate the system it operates quickly if the correct code is entered.

If the code entered is not correct, the timing logic circuit will time out and create a time delay (preferably at least 5 seconds) that one must wait before entering another code. This state is "tenacious" so that a large 1-5 second delay is incurred over the IC chip even if the chip is powered down several times during this interval. These "tenacious" latch states do not reset quickly, even after the tag power is interrupted and subsequently restarted. In particular, as there is virtually no possibility of leakage through the AND gate, the capacitor leaks slowly through the NMOS transistor drain region shown in FIG. 2, as connected to Node B. The capacitance of the dielectric capacitor is much greater than the capacitance across the NMOS junction capacitance such that the time constant at node B is increased to greater than one second, even at room temperature.

Electronic devices normally have very fast time constants, but this structure guarantees a long time constant one-shot whether the chip is powered or not. Preferably, the one-shot circuit has a timing interval of greater than one second at room temperature independent of power fluctuations. Room temperature is preferably an operating range of the tag, such as within ten degrees of ~20 degrees Celsius (i.e., ~10 degrees Celsius to ~30 degrees Celsius).

Since it is desirable to use a shorter code (for example 8-bits) as the disable code, it is important to provide a time delay that would prevent someone from rapidly entering the various (256 for an eight bit code) permutations of the code.

This circuit structure for building "tenacious latches" is also applicable for stabilizing other storage nodes, such as, for example, a "sleep/wake latch" and a 3-bit "channel-code latch." The device also has application in an $E^2$PROM The circuits according to preferred embodiments function as follows. The first time a command to destruct is sent to the chip, the chip receives a signal to enable the destruct circuit and a destruct code. The destruct code (for example an 8-bit destruct code) enters the circuit through a gate 206 and passes through to the code comparator 212. Next, the voltage at node B (see FIGS. 2 and 5) is driven high. If the code comparator subsequently determines that the code is correct, a signal is transmitted through the AND gate and disabling means (the logic inside the dotted lines on the left of FIGS. 2 and 5) is activated, the fuse blows and the chip destructs.

On the other hand, if the code comparator determines the code to be incorrect, no signal passes through the AND gate and the disabling means is not activated.

In the event that the enabling means is not activated the capacitor remains charged and then leaks slowly. At the same time voltage is transmitted (see FIGS. 2 and 5) from node B as a control signal to the gate 206 (or other extremely low leakage logic) to disable the gate and prevent transmission of any code through the gate until the voltage at node B goes low.

Thus, if the initial destruct code entered is correct, the high voltage at node B enables the activation of the disable circuit, but if the initial destruct code entered is incorrect the high voltage state at B disables the further transmission of any code to the code comparator until the voltage at node B returns to a logic zero level of typically less than 0.5 volts.

Typically, in integrated circuits the state at node B would change rapidly in line with the change in state of the input voltage ($V_{IN}$) into the circuit. The structure of the timing delay, however, maintains the voltage at node B in a high state for a significant period of time, for example 1-5 seconds, even if the state of the input voltage changes or the power supply is interrupted. Thus node B is a "tenacious" or semi-volatile node. The state of node B is maintained high because leakage from the capacitor can only travel toward the junction, transistor $Q_1$ in FIGS. 2 and 5. Leakage through the gate 206 and dielectric capacitor 208 are negligible.

Figure 3:
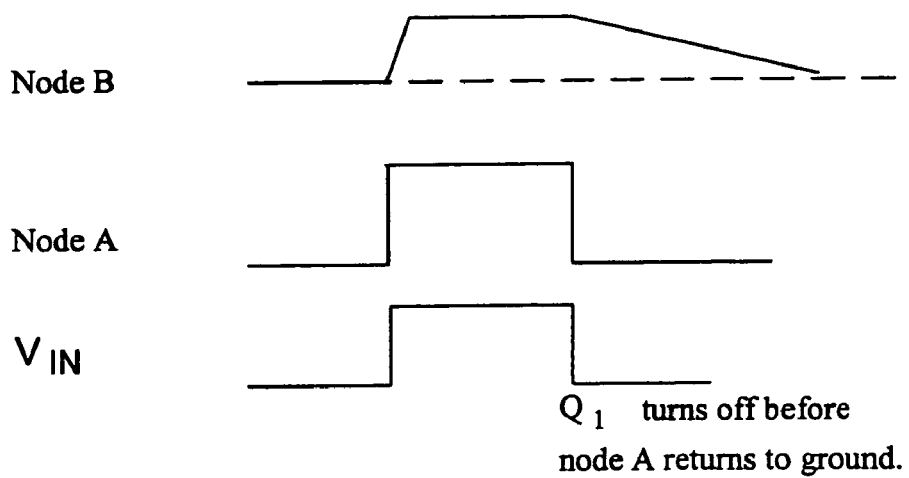
FIG. 3 illustrates the timing relationship of the voltage at $V_M$, Node A and Node B of FIG. 2.

The timing relationship between node A and node B is illustrated in FIG. 3. The input must rise first and therefore cut off the transistor $Q_1$ after node A begins to drop towards ground. During the time out interval, node B junction leakage is coupled only to ground and not to any other voltage independent of whether the chip is powered or not. The time out interval corresponds to the time when the capacitor is charged and leaking.

Figure 4:
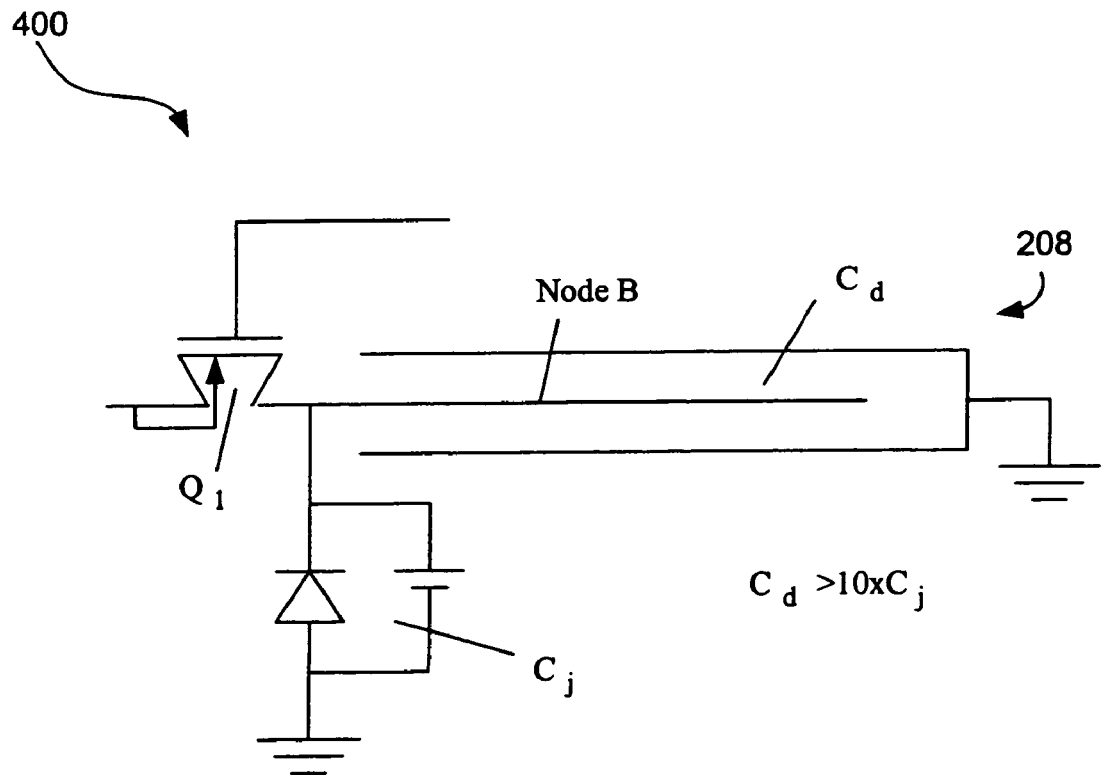
FIG. 4 illustrates the structure of the invention according to one embodiment.

FIG. 4 shows the structure of the invention 400 according to a preferred embodiment. Node B is physically connected to the inner layer of dielectric capacitor $C_d$ (or other high ultra-low leakage capacitance device), and again, is grounded during the time out interval. $C_d$ is a dielectric capacitor that, typically, has upper and lower polysilicon layers. In $C_d$, most of the capacitance is due to a non-conductive oxide that maximizes capacitance and has an extremely long time constant. On the other hand the capacitance $C_j$ of the junction is minimized since it has a time constant of only a few milliseconds. A unique feature of the timing structure is that the combination of a dielectric capacitor and junction capacitor, in a structure that mainly takes advantage of the high dielectric capacitance and that minimizes the junction capacitance, gives the structure a time constant measured in seconds. A requirement of the structure is that the dielectric capacitance is at least ten times greater than the junction capacitance.

Importantly, one should note that the structure disclosed in this invention can be put into a miniature integrated circuit. The structure is an integrated tenacious node that comprises its own capacitor. The capacitor is typically a high quality $SiO_2$ or $Si_3N_4$ capacitor that can be integrated onto a microchip or even smaller integrated circuit. Ferroelectric material also can be used to make the capacitor.

One skilled in the art will recognize that any device that might suffer from a loss of power will benefit from a tenacious storage state or latch.

In a preferred embodiment, the disclosed circuitry is used in conjunction with a destruct sequence. The destruct sequence of commands comprises an identity match; followed by a correct response; followed by a purchase. The cash register reader then provides a unique 8-bit DESTRUCT code within 5 seconds; which then creates a minimum 5 second window in which the tag can be destroyed within a range of 10 cm. Receipt of further DESTRUCT commands is automatically disabled for 5 seconds or more after any unsuccessful destruct attempt.

Thus, there are times when it is desirable to permanently disable or destroy an RFID tag after purchase. Furthermore, when a tag is destroyed it is desirable that other tags within range of the disabling device, typically a reader, are not also destroyed.

In one scenario, a destruct sequence is performed on a selected tag. The selected tag may be sufficiently close to the reader or previously known to be unique so that no specific procedure need be undertaken to select the tag.

Alternatively, the tag may be one of many tags within range of the reader. In this case an anti-collision procedure might need to be performed to select the tag, that is, to prevent information from and to the tag from being corrupted by other tags. There are a number of known methods of performing anti-collision to select one specific RF tag from many RF tags responding to a given reader signal.

Once the tag is selected the destruct sequence begins The destruct sequence leads to the permanent destruction of the tag provided that the circuitry of the tag is designed to destroy the tag when the appropriate sequencing conditions are met.

Once the tag is selected and its identity is believed to be known, a destruct sequence is performed. The destruct sequence comprises a series of steps in the following sequence: an ID CONFIRMATION, a PURCHASE, DESTRUCT CODE TRANSMISSION and VERIFICATION AND DESTRUCTION. Furthermore, a REQUEST FOR DESTRUCTION must occur somewhere during the sequence.

It is important to emphasize that there can be different levels of security. Someone taking inventory may be able to access certain tag information, but will not be allowed to disable or destroy the tag. For example, the person taking inventory may have access to a CONFIRM CODE to verify a tag's identity but not to other steps in a disable or destroy sequence or may have access to a Confirm Code to start a destruct sequence but not to a second special Destruct Code required to complete a destruct sequence. Other personnel, for example a checkout person might have access to all the necessary means to initiate a destruct sequence to destruct a tag.

An example of the use of a CONFIRM CODE is that at the end of a search, a reader calculates an 8-bit CRC (sufficient to enable the tag to detect multiple bit errors) and sends the CRC to the tag. The tag compares the CRC with a pre-calculated 8-bit code and mutes if there is no match. If the codes match on the tag, the tag will send another stored 8-bit code back to the reader.

The second step is the PURCHASE. Once a purchase is made, the ability to download a disable or destruct code is permitted. That is, the purchase of the item makes it possible to download the code required to destroy a tag. The DESTRUCT CODE can be, for example a unique 8 bit code.

It is noted that in certain circumstances either the purchaser or the seller may choose to not destroy the tag. Thus, even if a purchase has been made, a request for destruction must be present in order to send the DESTRUCT CODE to the tag. It should also be noted that under other circumstances, for example when an item is a final sale and cannot be returned, a purchase triggers an automatic request for destruction.

The third step is DESTRUCT CODE TRANSMISSION. In the DESTRUCT CODE TRANSMISSION step, provided that a REQUEST FOR DESTRUCTION has been made during the sequence, the destruct code is downloaded and transmitted to the tag.

The fourth step is DISABLEMENT or DESTRUCT. The tag confirms that the destruct code is valid and destroys the tag.

In a preferred embodiment, the destruct sequence of commands comprises an identity match; followed by a correct response; followed by a purchase. The cash register reader then may (or may not) provide a unique 8-bit DESTRUCT Code, after which the tag configures itself for destruction, verifies that the DESTRUCT CODE is valid, and is subsequently destroyed by having the tag within a range of, for example, 10 cm from the reader. Receipt of further destruct commands is automatically disabled for 5 seconds or more after any unsuccessful destruct attempt.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for disabling a passive tag, the method comprising:
   receiving an interrogating RF signal, the interrogating RF signal providing power to the tag;
   receiving a disable code from an interrogator;
   comparing the disable code from the interrogator to a disable code of the tag; and
   if the disable code from the interrogator is incorrect, creating a timeout interval for a disable circuit that is configured to disable the tag, the timeout interval providing security, wherein the disable circuit is prevented from being activated during the timeout interval despite loss of a power supply to the tag.

2. The method of claim 1 further comprising, if the code is correct, enabling the disable circuit for a time window.

3. The method of claim 2 wherein the time window is 5 seconds.

4. The method of claim 2 further comprising permanently disabling the tag and wherein the interrogating RF signal is part of a communication protocol which is a half duplex, reader talk first protocol.

5. The method of claim 2 further comprising temporarily disabling the tag.

6. The method of claim 1 wherein the timeout interval is at least 1 second.

7. The method of claim 1 wherein the timeout interval is at least 5 seconds.

8. The method of claim 1 wherein the timeout interval is 1-5 seconds.

9. The method of claim 1 wherein the code from the interrogator is 8 bits in length.

10. The method of claim 1 wherein the disable circuit comprises at least one of a fuse, anti-fuse, and EEPROM.

11. The method of claim 1 wherein the tag is disposed within 10 centimeters of the interrogator.

12. The method of claim 1 further comprising receiving a CRC from the interrogator.

13. The method of claim 12 further comprising muting the tag if the CRC does not match a pre-calculated code.

14. The method of claim 1 wherein, during the timeout interval, the tag receives power from the interrogating RF signal.

15. The method of claim 1 wherein creating the timeout interval for the disable circuit comprises automatically creating in the tag the timeout interval.

16. A method for operating an interrogator to disable a passive tag, comprising:
   transmitting an interrogating RF signal to provide power to the tag;
   identifying the tag;
   transmitting a disable code to the tag in a first attempt; and
   if the first attempt is unsuccessful, preventing transmission of the disable code to a disable circuit in a second attempt during a timeout interval, wherein the second attempt is to destroy the tag permanently,
   wherein the timeout interval is at least 400 milliseconds and wherein the waiting is in response to the disable code being incorrect and wherein the tag's timeout state is maintained despite loss of a power supply to the tag.

17. The method of claim 16 further comprising calculating a CRC and wherein the interrogating RF signal is part of a communication protocol which is a half duplex, reader talk first protocol.

18. The method of claim 17 further comprising transmitting the CRC to the tag.

19. The method of claim 16 wherein the disable code is 8 bits in length.

20. The method of claim 16 wherein the timeout interval is at least 5 seconds.

21. The method of claim 16 wherein the timeout interval is at least 1 second.

22. A method to disable an RFID tag, the method comprising:
   receiving an interrogating RF signal, the interrogating RF signal providing power to the tag;
   receiving a disable code;
   matching, by the tag, the disable code to a second code; and
   if the disable code is incorrect, creating a timeout interval for a disable circuit that is configured to disable the tag, the time out interval providing security, wherein the disable circuit is prevented from being activated during the timeout interval despite loss of a power supply to the tag, wherein the creating of the timeout interval is in response to the disable code being incorrect.

23. The method of claim 22 wherein the timeout interval is at least one second.

24. The method of claim 22 wherein the timeout interval is at least five seconds.

25. The method of claim 22 further comprising permanently disabling the tag and wherein the interrogating RF signal is part of a communication protocol which is a half duplex, reader talk first protocol.

26. The method of claim 22 wherein the disable code is 8 bits in length.

27. The method of claim 22 wherein the disable circuit comprises at least one of a fuse, anti-fuse, and EEPROM.

28. The method of claim 22 wherein the tag is disposed within 10 centimeters of an interrogator.

29. The method of claim 22 further comprising receiving a CRC from an interrogator.

30. The method of claim 29 further comprising muting the tag if the CRC does not match a pre-calculated code.

31. A passive RFID tag, comprising:
- an antenna to receive an interrogating RF signal, the interrogating RF signal providing power to the tag;
- a first circuit to compare a disable code, the first circuit being coupled to the antenna;
- a tag disable circuit configured to disable the tag, the tag disable circuit being coupled to the first circuit; and
- a charge storage portion to create a timeout interval for a disable circuit that is configured to disable the tag, the timeout interval providing security, wherein the tag disable circuit is prevented from being activated during the timeout interval despite loss of a power supply to the tag, wherein the timeout interval is created in response to the disable code being determined by the first circuit to be incorrect.

32. The tag of claim 31 further comprising permanently disabling the tag and wherein the interrogating RF signal is part of a communication protocol which is a half duplex, reader talk first protocol.

33. The tag of claim 31 wherein the timeout interval is at least 1 second.

34. The tag of claim 31 wherein the charge storage portion includes a capacitor, the capacitor comprising at least one of a $SiO_2$, $Si_3N_4$, and Ferroelectric material.

35. The tag of claim 31 wherein the first circuit is coupled to the antenna to receive the disable code through the antenna and wherein the charge storage portion is coupled to the disable circuit which is coupled to the first circuit.

36. A passive RFID tag, comprising:
- an antenna to receive an interrogating RF signal, the interrogating RF signal providing power to the tag;
- a first circuit to compare a disable code, the first circuit being coupled to the antenna;
- a charge storage portion to create a timeout interval for a disable circuit that is configured to disable the tag, wherein the disable circuit is prevented from being activated during the timeout interval despite loss of a power supply to the tag,
- wherein the charge storage portion includes a capacitor, the capacitor comprising at least one of a $SiO_2$, $Si_3N_4$, and Ferroelectric material, and
- wherein the capacitor comprises an intermediate conductor sandwiched between two polysilicon shields.

37. The tag of claim 36 wherein the capacitor further comprises an insulator, the insulator comprising at least one of silicon nitride and silicon dioxide.

38. The tag of claim 31 wherein the antenna is at least one of a dipole, folded-dipole, and loop antenna.

39. A passive RFID tag comprising:
- an antenna to receive an interrogating RF signal, the interrogating RF signal providing power to the tag;
- a comparator circuit coupled to the antenna, the comparator circuit to compare a disable code from an interrogator to a code of the tag; and
- a disable circuit that is configured to disable the tag coupled to the comparator circuit, the disable circuit being configured to have a timeout interval in response to the comparator circuit determining that the disable code from the interrogator is incorrect, the timeout interval providing security, wherein the disable circuit is prevented from being activated during the timeout interval despite loss of a power supply to the tag.

* * * * *